(12) United States Patent
Yang

(10) Patent No.: US 6,275,011 B1
(45) Date of Patent: Aug. 14, 2001

(54) CHARGING DEVICE HAVING A BROAD VOLTAGE CHANGING RANGE, AUTOMATIC CHARGING CUTOFF BASED ON TEMPERATURE DETECTION, AND CHARGING STATUS MAINTENANCE.

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 0 days.

(21) Appl. No.: 09/456,513

(22) Filed: Dec. 8, 1999

(51) Int. Cl.[7] .................................................. H02J 7/04
(52) U.S. Cl. ............................................................ 320/150
(58) Field of Search .................................. 320/150, 152, 320/154

(56) References Cited

U.S. PATENT DOCUMENTS

| | | | |
|---|---|---|---|
| 4,609,861 | * | 9/1986 | Inaniwa et al. ............... 320/152 |
| 4,952,861 | * | 8/1990 | Horn ............................. 320/133 |
| 5,013,993 | * | 5/1991 | Bhagwat et al. ............. 320/150 |
| 5,049,804 | * | 9/1991 | Hutchings ..................... 320/150 |
| 5,451,857 | * | 9/1995 | Moe ............................... 320/150 |
| 5,640,059 | * | 6/1997 | Kammiller et al. ........... 307/66 |
| 5,714,868 | * | 2/1998 | Uchida et al. ................. 320/150 |
| 5,767,659 | * | 6/1998 | Farley ........................... 320/150 |
| 5,826,958 | * | 10/1998 | Avitan ........................... 320/136 |
| 5,841,285 | * | 11/1998 | Bailey ......................... 320/DIG. 18 |
| 5,869,969 | * | 2/1999 | Cividino et al. .............. 320/153 |
| 5,898,294 | * | 4/1999 | Gold ............................... 320/139 |
| 5,926,003 | * | 7/1999 | Morita ........................... 320/107 |
| 6,054,861 | * | 4/2000 | Takahashi ..................... 320/149 |
| 6,075,339 | * | 6/2000 | Reipur et al. ................. 320/150 |
| 6,075,378 | * | 6/2000 | Okamura ....................... 320/122 |
| 6,081,101 | * | 6/2000 | Yang ............................. 320/154 |

* cited by examiner

*Primary Examiner*—Peter S. Wong
*Assistant Examiner*—Pia Tibbits
(74) *Attorney, Agent, or Firm*—Bacon & Thomas, PLLC

(57) ABSTRACT

A charging circuit includes a negative temperature coefficient resistor element serving to verify the temperature of a rechargeable battery cell, such that once the cell is charged to saturation and the temperature of the cell rises to a predetermined level, the negative temperature resistor element will reduce its resistance in response, and in turn cause the charging circuit to automatically switch to a small current charging status, the charging status being maintained once the resistance of the negative temperature coefficient resistor element again starts to increase should the temperature of the cell that is being charged decrease, or should voltage fluctuation remain within a predetermined power supply voltage level, the charging circuit being arranged to reset itself once the rechargeable cell is removed or the power supply suspended.

7 Claims, 2 Drawing Sheets

CHARGING DEVICE HAVING A BROAD VOLTAGE CHANGING RANGE, AUTOMATIC CHARGING CUTOFF BASED ON TEMPERATURE DETECTION, AND CHARGING STATUS MAINTENANCE.

BACKGROUND OF THE INVENTION (a) Field of the Invention

A Charging Circuit suitable for Broad Voltage Changing Range and of the type of temperature detection automatic cutoff and of Transient Status Maintaining, composed of Transient Maintaining Ckt. suitable for Broad Voltage Range and Negative Temperature Coefficient Resistor Elements serving to verify the temperature of rechargeable cells, such that once the cell is charged to saturation and the temperature of the rechargeable cell rises to a predetermined level, the Negative Temperature Resistor Element will reduce its resistance in response, and that in turn will cutoff the Ckt. automatically, switch to a small current charging status, and the charging status will be maintained once the resistance of the Negative Temp. Coefficient Resistor Element reverts to increase should the temp. of the cell that is being charged go down, or should voltage fluctuation remain within a predetermined power supply voltage level, and the Circuit will reset itself once the rechargeable cell is removed or the power supply suspended.

(b) Description of the Prior Art

As is well known in the profession, conventionally a Charging Ckt. of the Automatic Cutoff and Transient Status Maintaining Type relies on Voltage or Current Detector composed of electronic elements to charge Rechargeable Cells incorporating Temp. Control Switches which, on sensing that there is a rising in temp. as a result of the rechargeable cell reaching saturation, will cause the charging unit to turn to feed a smaller current to the rechargeable cell, whereby the charging function is maintained all the while, a major shortcoming with such conventional Charging Ckt. of the Automatic Cutoff and Transient Status Maintaining Type is that it involves lots of electronic components built on a complicated structure necessitating expensive costs, and most regrettably, low reliability.

SUMMARY OF THE INVENTION

The primary object of the invention is to provide a Charging Ckt. suitable for Broad Voltage Changing Range and of the type of Temperature Detection Automatic Cutoff and of the Type of Transient status Maintaining which is able to control a thyristor to cut off the Main Charging Current once the saturation temperature of the rechargeable cell rises to a predetermined level that is sensed on a negative temp. coefficient resistor element which is coupled directly or indirectly to the same rechargeable cell, structurally the invention comprises:

Charging power supply: which can be any of a pure D.C., half-wave D.C., Full-Wave D.C., Intermittent Pulsating D.C., or rippled D.C. type; or alternatively one of a stabilized source or one variable source of which voltage variation is restricted within a predetermined ranging;

Rechargeable Cell: A Secondary Rechargeable Cell to be matched to a Thermo-control Switch and characterized by a rise in temperature concurrent with saturation;

Transient status Maintaining Ckt. fit for a Broad Voltage Ranging; composed of solid state electronic or electric components to be controlled as a function of negative temperature coefficient resistive elements incorporated on the rechargeable cell itself and serving to detect the instantaneous temp. of the same rechargeable cell, such that once at any given instant the charging action taking place on the rechargeable cell brings the temp. up to the point of approaching the saturation temp. the resistance on the part of the negative temp. coefficient resistor will reduce in response, and that eventually putting the Control Thyrister SCR open, meantime a Topping Charge of a smaller magnitude will pass a shunt bypass in parallel across the Anode A and Cathode K of said Thyrister, whereby a continued charging function is maintained concurrent with a continuous charging capability suitable for operation with a Transient Status Maintaining Ckt. under a Broad Voltage Changing Range clear and free of interferences until and unless the power supply is cutoff, or the rechargeable cell removed, whereupon the Transient Status Maintaining Ckt. will reset itself forthwith.

DETAILED DESCRIPTION OF THE PREFERRED EMBODIMENTS

Figure 1:
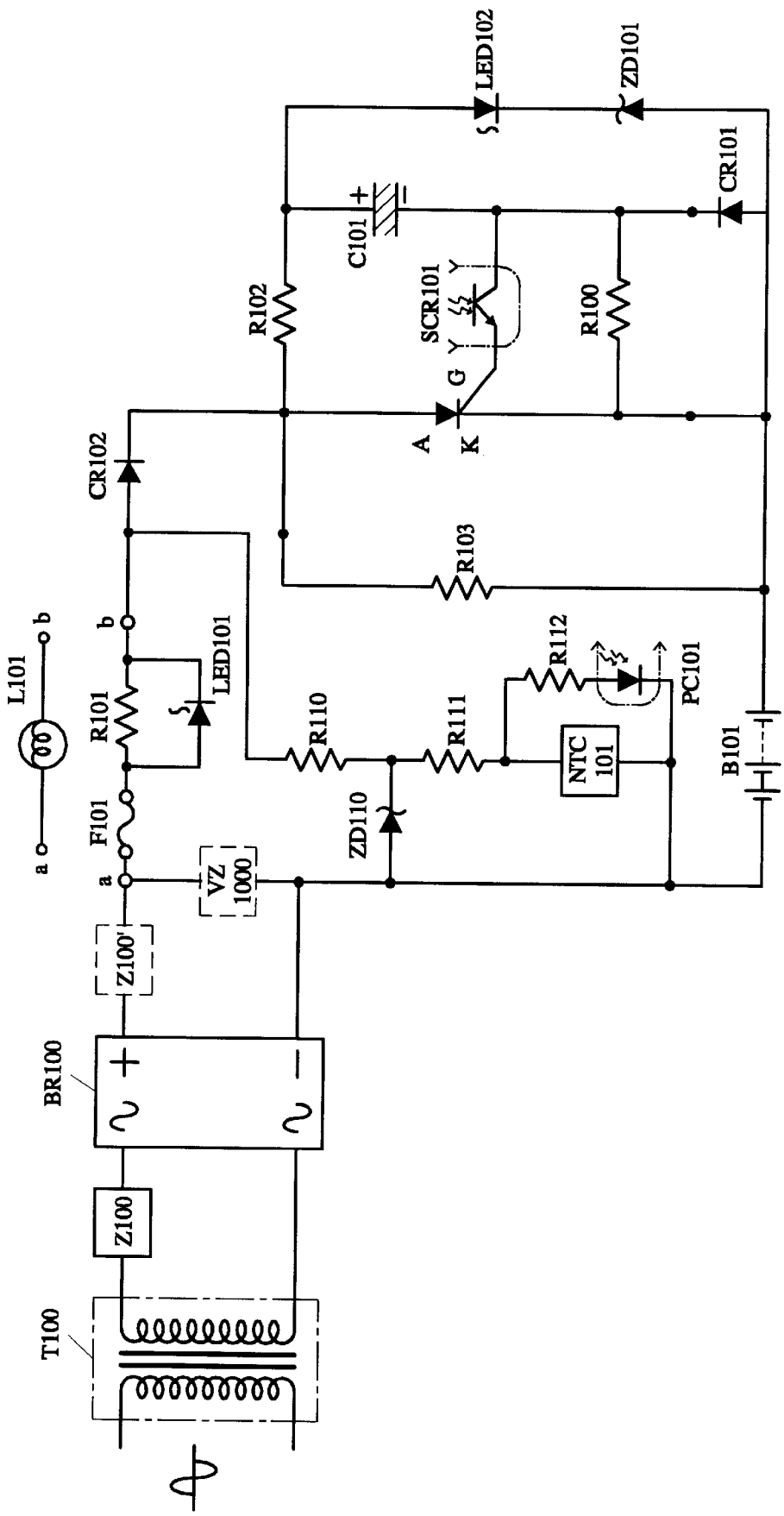
FIG. 1 is a schematic diagram of an Automatic Cutoff Charging Circuit embodied with a Rechargeable Cell and the Negative Temperature Coefficient Resistive Element integral therewith, prosecuted according to the invention.

Referring to FIG. 1, an illustration of the invention embodied to be an Automatic Cutoff Charging Circuit integral with a Rechargeable Cell and the Negative Temperature Coefficient Resistive Element, suitable for broad range voltage variation and capable of maintaining a Transient Status, whereof the power supply can be one of a Pure D.C., half-wave D.C., Full-wave D.C., Intermittent Pulsating D.C., or still a rippled D.C. source; or alternatively one of a stabilized source or still one variable source of which voltage variation is restricted within a predetermined ranging; whereas said Automatic Cutoff and Transient Status Maintaining Type Charging Circuit permissive of Temperature Detection within a Broad Range of Voltage Variation is composed entirely or selectively of all or part of parts and components listed below:

A.C. Transformer T100: whereby A.C. power is delivered to the primary side, and the same is to be output from the secondary side, the A.C. Transformer may be employed selectively per circuitry requirements or it may be dispensed with by having A.C. Current input direct instead;

A.C. Limiting Impedance Z100: constituted of impedance element which is either capacitive or inductive or resistive, serving to prevent the load side from being shorted. Or alternatively composed of two or more of afore-mentioned impedance elements, as a composite A.C. Limiting Impedance Component, for serial connection way between the A.C. Power Supply and Rectifier BR100, theA.C. Limiting Impedance Z100 being an optional installation;

D.C. Limiting Impedance Z100': an optional Unit, which, in the form of a resistor or active crystal in combination with a drive ckt. may be connected in series way between the D.C. source and the Load side where the power supply is a D.C. system or the working current is of a D.C. form rectified from an A.C. source, so that an A.C. Limiting Impedance Z100 is not connected serially on the A.C. side, in respect of which installation is dictated by the need;

Zener Effect Element VZ1000: being an optional element comprising a Zener Diode or a forward bias to be provided by a diode assembly serving a voltage stabilization purpose;

Rechargeable Cell B101: comprising such rechargeable cells characterized by a rise in temperature once reaching saturation, and in forward series with Blocking Diode CR102 and Thyrister SCR101;

Display and Protection Ckt.: way between the Rechargeable Cell B101 and the Blocking Diode CR102, and way between the Thyrister SCR101 Series Ckt. and the power supply on which a charging operation relies there may be optionally provided in parallel a Limiting Resistor R101 with a Light Emitting Diode LED101, to account for a Display, this in forward series with Anode A and Cathode K of Thyrister SCR and Rechargeable Cell B101, led to the Power Supply; said Limiting Resistor R101, Light Emitting Diode LED101 and Overload Protector F101 being replaceable with a Filament Bulb L101, this Display and Protection Ckt. being and optional device in respect of which installation is dictated by the need;

Voltage splitting Resistor R102, in series with Trigger Capacitor C101, with one pin thereof connected to the positive polarity of the power supply; while the other pin of the Trigger Capacitor C101 is in series with the crystal side of Photo-coupler PC101, thence in conduction with the Trigger Grid G of Thyrister SCR101; the positive polarity of the Thyrister SCR101 passing to the positive polarity of power supply; where needed or justified, a splitting Resistor R100 maybe installed in parallel with the junction point where the output terminal of Photo-Coupler PC101 meets the Trigger Capacitor C101, on one point, and with Cathode K, on the other point, to regulate the Thyrister Performance Stability as well as the Trigger Sensitivity;

Photo-coupler PC101: whereof the input side consists of a photo-emitting diode against which a complementary photo-sensitive crystal constitutes the output side, the input side being controlled as a function of the negative temperature coefficient resistor that is coupled to the rechargeable cell, the output side being in series with the Gate of the Thyrister SCR101;

Negative Temp. Coefficient Resistor Element NTC101: composed of negative temp. coefficient resistor, may be coupled directly or indirectly with Charging Battery B101 to have its resistance decreased in response to a rise in the temp. of the charging battery;

As means of display LED102 and a zener diode ZD101 in series with LED102 forms voltage limiting and current splitting capabilities, in parallel across the junction points of voltage dividing resistor R102 and Capacitor C101 and the negative polarity of power supply to produce voltage limiting and bypass current splitting capabilities, so that the capacitor across both ends is protected intact from interferences due to any fluctuation in power supply voltage while current flowing through ZD101, (or further through a selectively provided LED 102 in series with ZD101) serves the purpose of supplementary charge (Topping Charge) with respect to the Rechargeable Battery B101 following the closure of Thyrister SCR 101, this Display & Protection Ckt. is an optional provision;

Bypass current splitting resistor R103: serving as a discharging resistor for Capacitor C101 on shutdown or when the rechargeable Battery is removed, and which may be provided in parallel way between the Anode A and the Cathode K of the Thyrister SCR101 optionally where the topping current as required is larger, so as to assist in maintaining a relatively larger charging current, this Bypass current splitting resistor R103 is an optional provision;

Discharging Diode CR101: in parallel across the Cathode K and the Gate G of the Thyrister SCR101, whose polarity layout is such that on removal of the Rechargeable Battery B101 it makes possible the formation of a discharging Ckt. together with capacitor C101 and the Bypass Splitting Resistor R103;

Voltage Stabilization Power Supply: composed of a Blocking Diode CR102 in forward connection with the output end of the charging power supply, then in parallel with the other terminal of the power supply just in order for serial connection with Active Resistor R110 and the Zener Diode ZD110; both ends of the Zener Diode VZ110 being output terminals for voltage stabilized power supply; or alternatively composed of other solid state or electromechanical voltage stabilization Ckt., in respect of which the bypass splitting resistor R103 is an optional provision;

Voltage Division Ckt.: composed of the Current Limiting Resistor R112 in series with the output of the Photo-coupler PC101, then in parallel with the Negative Temp. Coefficient Resistor, then altogether in series with Voltage Divider Resistor R111, for parallel with the Voltage Stabilization Power Supply, in respect of which the bypass splitting resistor R103 is an optional provision.

Figure 2:
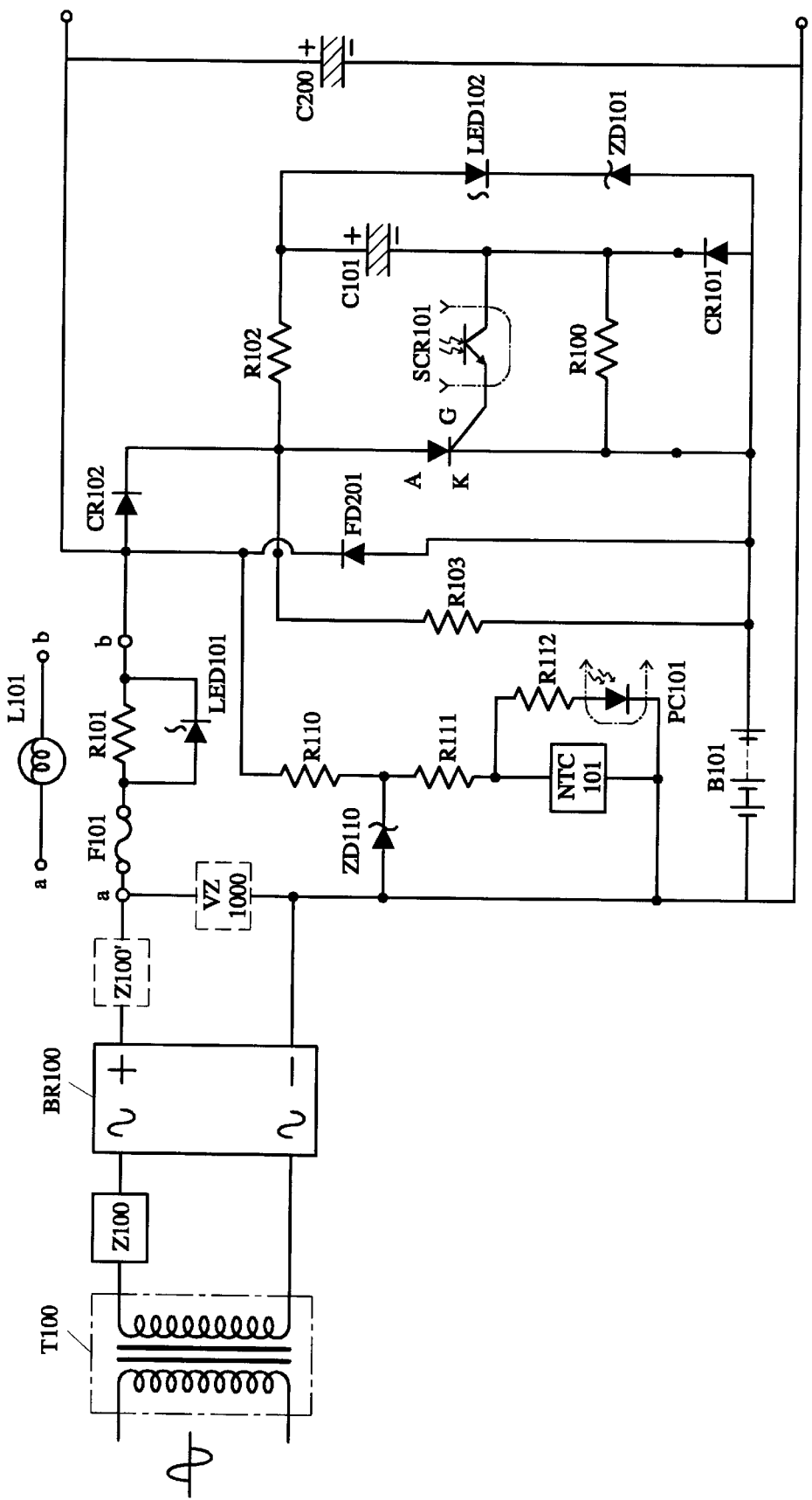
FIG. 2 is an illustration showing the addition of a Reflow Diode to the circuit shown in FIG. 1 to consummate the Automatic Emergency Power Supply Function.

What follows is a description of the operation principle of the circuitry illustrated in FIG. 1:

To start charging of a rechargeable battery, instantaneous charging current way from R102 to Capacitor C101 triggers the Gate G of Thyrister SCR101 to conduction so that the circuit begins charging Battery B101 with normal charging current, when Battery B101 approaches saturation to bring about a rise in temp., the resistance of the negative temp. coefficient resistor directly of indirectly coupled thereto will decrease, and that in turn brings about a decrease of the voltage across the two terminals of said resistor, such that, by and by the LED on the input side of the Photocoupler PC101 turns off, the output side cutoff, the thyrister SCR101 suspended from conduction, whereby voltage occasioned by the charging current passing the bypass resistor R103 and R102 is the same as voltage occasioned by current passing LED102 having a current splitting effect and passing the Zener Diode ZD110, as well as an optionally provided Photo-emitting Diode LED102 mathematically, unaffected by any fluctuation in the power supply voltage;

When the negative temp. coefficient resistor undergoes a decrease in temp. so that its resistance reverts to increase, whether this occurs during a Topping Charge or Resetting, potential by the capacitor C101 will remain unchanged so long as the power supply voltage anytime active falls within a set ranging, as that is a situation whereby no current passes the Thyrister SCR101 to trigger the Gate G, so the Thyrister SCR101 will continue to maintain an open state;

When the charging is terminated, Battery B101 is removed, or when the A.C. power input is cut off, potential theretofore stored in the capacitor C101 will be triggered to discharge by way of bypass current splitting resistor R103 and the Discharge Diode CR101, so that the circuit is reset, to a ready-to-be-triggered state;

Moreover, in the foregoing embodiment it is further feasible to install a Reflow Diode FD201, serving to allow supply of power way from the Charging Battery to the load driven by the positive/negative output terminals of the principal D.C. Power Source in case of power failure;

In FIG. 2 is shown an example of circuitry featuring Emergency Automatic Power Supply by the incorporation of a Reflow Diode FD201 into the circuit that is shown in FIG. 1, said example comprises essentially:

Reflow Diode FD201: being reversely paralleled way between the Rechargeable Battery B101, positive polarity, and the D.C. Power Supply, positive polarity too;

Load: being paralleled way between the negative polarity of the Rechargeable Battery B101 and the positive polarity of the Power Supply, normally driven by potential from power supply, forms instead a power supply loop together with Reflow Diode FD201 when power supply is suspended.

Stabilization Capacitor C101: in parallel with the load to stabilize switching process, in respect of which the capacitance may be determined optionally or omitted altogether.

In the embodiments described in reference to both FIG. 1 and FIG. 2, following applications are open to option without effecting any change in circuitry rationale:

(1) Arrangement of polarity and serial rapports for components in the Ckt. where needed in coordination with the polarity rapports respecting power supply and circuitry;

(2) Having the positive polarity of Rechargeable Battery B101 connected with the positive polarity of power supply as needed, and the negative polarity K of Thyrister SCR101 associated with the negative polarity of the cathode K; or alternatively having the positive polarity A of the thyrister SCR101 connected with the positive polarity of power supply, but the negative polarity of the Rechargeable Battery B101 with the negative polarity of power supply;

(3) Having elements of charging Ckts. (negative temp. coefficient resistors) produced and assembled to the charging device where justified by a need, or alternatively having elements of charging Ckts. and rechargeable cells produced and assembled together, or still having part of Ckt. elements installed in the charging unit, others installed in the Rechargeable Cell, to be interconnected mutually by conductor means or contacts, plug/socket sets.

In summation, in this invention, a charging circuit suitable for broad voltage changing range and of the type of temperature detection automatic cutoff and of the type of transient status maintaining, by detecting battery charging saturation and a temperature rising condition by means of negative temperature coefficient resistor elements installed in the charging battery, it will switch to an automatic Topping Charge status in the event the battery has reached saturation as a result of charging, meantime restrict interference on the capacitor due to any fluctuation in power supply voltage, while current flowing past voltage divider resistor R102 and current flowing past Zener Diode ZD101 as well as an optionally provided photo-emitting diode LED102, in series connection, serve as Topping Charge for the Rechargeable Cell, a further advantage lies in the provision of a reflow diode to make for an emergency automatic power supply Ckt. Overall, the structure is simple but highly effectual.

What is claimed is:

1. A charging circuits comprising:

a thyrister arranged to control a charging current supplied to a rechargeable battery;

a negative temperature coefficient resistor element coupled to the rechargeable battery, said negative temperature coefficient resistor element having a resistance that decreases in response to a rise in temperature of the rechargeable battery to detect a charging saturation state of the battery; and a photo-coupler having an input side connected to a negative temperature coefficient resistor element and an output side connected in series with the gate of said thyrister, whereby the charging current is controlled by the thyrister in response to a rise in the temperature of the rechargeable battery when the rechargeable battery is fully charged.

2. A charging circuit as claimed in claim 1, further comprising a trigger capacitor connected in parallel with said thyrister, and a voltage splitting resistor in series with the trigger capacitor, wherein one terminal of said trigger capacitor is connected to a positive terminal of a power supply, and wherein said output side of said photo-coupler is connected between the gate of the thyrister and a second terminal of the trigger capacitor.

3. A charging circuit as claimed in claim 2, further comprising a light emitting diode and a zener diode connected in parallel with said trigger capacitor.

4. A charging circuit as claimed in claims 3, further comprising a discharging diode connected in parallel across a cathode and the gate of the thyrister, a polarity of the discharging diode being arranged such that upon removal of the rechargeable battery a discharging circuit if formed together with the trigger capacitor and the discharging resistor.

5. A charging circuit as claimed in claim 2, further comprising a resistor connected in parallel with said trigger capacitor to provide a discharging resistor for said capacitor on shutdown or when said rechargeable battery is removed.

6. A charging circuit as claimed in claim 1, further comprising a current limiting resistor connected in series with the input side of said photo-coupler and in parallel with the negative temperature coefficient resistor element.

7. A charging circuit as claimed in claim 1, further comprising a resistor connected in parallel with a light emitting diode, the limiting resistor and light emitting diode being connected between a power supply and a cathode of the thyrister.

* * * * *